United States Patent
Kotalwar et al.

(10) Patent No.: US 8,165,122 B2
(45) Date of Patent: Apr. 24, 2012

(54) SYSTEM AND METHOD FOR CONVERTING UNICAST CLIENT REQUESTS INTO MULTICAST CLIENT REQUESTS

(75) Inventors: Jayant Kotalwar, Sunnyvale, CA (US); Venu Hemige, Union City, CA (US)

(73) Assignee: Alcatel Lucent, Paris (FR)

(*) Notice: Subject to any disclaimer, the term of this patent is extended or adjusted under 35 U.S.C. 154(b) by 294 days.

(21) Appl. No.: 12/472,315

(22) Filed: May 26, 2009

(65) Prior Publication Data

US 2010/0303071 A1    Dec. 2, 2010

(51) Int. Cl.
*H04L 12/56* (2006.01)
(52) U.S. Cl. .............................................. 370/390
(58) Field of Classification Search .................. 370/390, 370/230, 235; 709/227, 230, 203, 217, 233, 709/238
See application file for complete search history.

(56) References Cited

U.S. PATENT DOCUMENTS

| | | | |
|---|---|---|---|
| 7,274,702 B2 * | 9/2007 | Toutant et al. | 370/400 |
| 7,281,058 B1 | 10/2007 | Shepherd | |
| 2002/0012327 A1 * | 1/2002 | Okada | 370/328 |
| 2003/0079022 A1 | 4/2003 | Toporek | |
| 2010/0202454 A1 * | 8/2010 | Miller et al. | 370/390 |

FOREIGN PATENT DOCUMENTS

| | | |
|---|---|---|
| GB | 2418574 A | 3/2006 |
| WO | 2006036463 A2 | 4/2006 |

* cited by examiner

*Primary Examiner* — Man Phan
*Assistant Examiner* — Nourali Mansoury
(74) *Attorney, Agent, or Firm* — Kramer & Amado P.C.

(57) ABSTRACT

A system and method converting a unicast client request into a multicast client request is provided, the method comprising: receiving the unicast client request; mapping the unicast client request destination IP address and unicast client request destination port to a multicast record, wherein the multicast record contains a multicast destination internet protocol (IP) address and wherein the multicast destination IP address corresponds to the unicast client request destination IP address and unicast client request destination port; and transmitting the multicast client request that mirrors the received unicast client request to a plurality of destination servers using the multicast destination IP address that corresponds to the unicast client request destination IP address and unicast client request destination port.

16 Claims, 4 Drawing Sheets

| CLIENT REQUEST | | MULTICAST DESTINATION | |
|---|---|---|---|
| DESTINATION ADDRESS | DESTINATION PORT | DESTINATION ADDRESS | DESTINATION PORT |
| 1.1.1.1 | 1234 | 234.1.1.1 | 1234 |
| 2.2.2.2 | 3214 | 235.1.1.1 | 3214 |

SYSTEM AND METHOD FOR CONVERTING UNICAST CLIENT REQUESTS INTO MULTICAST CLIENT REQUESTS

TECHNICAL FIELD

The various exemplary embodiments relates to network communications. More particularly, the various exemplary embodiments relates to a system and method for converting unicast client requests to multicast client requests.

BACKGROUND

A unicast stream is a one-to-one connection between a destination server and a client. In general, this means that each client receives a distinct stream and only those clients that request the stream can receive it. Alternatively, when transmitting in the opposite directions, client requests are sent as unicast packets to the destination server. Content can be delivered as a unicast stream from either an on-demand or a broadcast publishing point. In the unicast stream transmission, each client has a unique connection to the destination server from which it is receiving the unicast stream.

As discussed above, when transmitting from a client to a destination server, the client requests are sent as unicast packets to the destination server. These requests are forwarded, hop-by-hop, to the destination server. The destination server then processes the requests and responds back to the client. There is a problem with this simple client-server architecture in that all the client requests end up at the addressed destination server.

Some applications, however, require client requests to be sent to multiple destination servers. There is a problem, however, if the client request should be sent to multiple destination servers. Current systems for transmitting unicast packets cannot send requests to multiple destination servers. Instead, the client request is replicated at the client server, and unicast to the other destination servers. Multiple requests therefore cause unnecessary traffic, slow down the communication system, and raise the possibility of other inefficiencies.

Accordingly, a need exists to transmit unicast client requests to multiple destination servers without replication of the original client request.

SUMMARY

In light of the present need for transmitting a unicast client requests as a multicast client request, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

According to a first exemplary embodiment, a method of converting a unicast client request into a multicast client request is provided, the method comprising receiving the unicast client request; mapping the unicast client request destination IP address and unicast client request destination port to a multicast record, wherein the multicast record contains a multicast destination internet protocol (IP) and wherein the multicast destination IP address corresponds to the unicast client request destination IP address and unicast client request destination port; and transmitting the multicast client request that mirrors the received unicast client request to a plurality of destination servers using the multicast destination IP address that corresponds to the unicast client request destination IP address and unicast client request destination port.

According to the first exemplary embodiment, the corresponding multicast destination IP address that corresponds to the unicast client request destination IP address and unicast client request destination port are chosen based on the unicast client request destination IP address and unicast client request destination port.

According to the first exemplary embodiment, the step of transmitting comprises determining, by accessing the multicast record, a plurality of outgoing interfaces that correspond to the plurality of destination servers, wherein the outgoing interfaces correspond to the destination IP addresses of the plurality of destination servers, and sending the multicast client request over the plurality of outgoing interfaces. According to the first exemplary embodiment the method further comprises receiving a join request from a new destination server, such that an outgoing interface corresponding to the new destination server is added to the multicast record.

According to the first exemplary embodiment, the method further comprises responding to the multicast client request by a predetermined number of a plurality of destination servers based on a load balancing arrangement, wherein the load balancing arrangement is determined prior to receipt of the multicast client request.

According to the first exemplary embodiment, the method further comprises responding to the multicast client request by a predetermined number of a plurality of destination servers based on a load balancing arrangement, wherein the load balancing arrangement is determined following receipt of the multicast client request.

According to a second exemplary embodiment, a system for converting a unicast client request into a multicast client request is provided, the system comprising: a plurality of destination servers; and a router configured to receive the unicast client request, wherein the router is further configured to map the unicast client request destination IP address and unicast client request destination port to a multicast record, wherein the multicast record contains a multicast destination IP address, and further wherein the router is further configured to transmit the multicast client request that mirrors the received unicast client request to the plurality of destination servers using the multicast destination IP that corresponds to the unicast client request destination IP address and unicast client request destination port.

According to the second exemplary embodiment, the corresponding multicast destination IP address that corresponds to the unicast client request destination IP address and unicast client request destination port are chosen based on the unicast client request destination IP address and unicast client request destination port.

According to the second exemplary embodiment the router is further configured to determine, by accessing the multicast record, a plurality of outgoing interfaces that correspond to the plurality of destination servers, wherein the outgoing interfaces correspond to the destination IP addresses of the plurality of destination servers, and wherein the router is further configured to send the multicast client request over the plurality of outgoing interfaces.

According to the second exemplary embodiment the router is further configured to receive a join request from a new destination server, such that an outgoing interface corresponding to the new destination server is added to the multicast record.

According to the second exemplary embodiment, the plurality of destination servers are configured to respond to the multicast client request by a predetermined number of the plurality of destination servers based on a load balancing arrangement, wherein the load balancing arrangement is determined prior to receipt of the multicast client request.

Still further according to the second exemplary embodiment, the plurality of destination servers are configured to respond to the multicast client request by a predetermined number of a plurality of destination servers based on a load balancing arrangement, wherein the load balancing arrangement is determined following receipt of the multicast client request.

According to the second exemplary embodiment, the system comprises an internet protocol television system, and further wherein the system is configured to distribute television, video, and audio content.

According to a third exemplary embodiment, a system for converting a unicast client request into a multicast client request is provided, the system comprising: a router configured to receive a unicast client request, wherein the router includes a plurality of destination servers, and the router is further configured to map the unicast client request destination IP address and unicast client request destination port to a multicast record, wherein the multicast record contains a multicast destination IP address, and wherein the multicast destination IP address corresponds to the unicast client request destination IP address and unicast client request destination port, and further wherein the router is further configured to transmit the multicast client request that mirrors the received unicast client request to a plurality of destination servers using the multicast destination IP address that corresponds to the unicast client request destination IP address and unicast client request destination port.

According to the third exemplary embodiment, the plurality of destination servers are configured to respond to the multicast client request by a predetermined number of the plurality of destination servers based on a load balancing arrangement, wherein the load balancing arrangement is determined prior to receipt of the multicast client request.

According to the third exemplary embodiment, the plurality of destination servers are configured to respond to the multicast client request by a predetermined number of a plurality of destination servers based on a load balancing arrangement, wherein the load balancing arrangement is determined following receipt of the multicast client request.

Still further according to the third exemplary embodiment, the system comprises: an internet protocol television system, and further wherein the system is configured to broadcast television video and audio content.

According to the third exemplary embodiment the router is further configured to determine, by accessing the multicast record, a plurality of outgoing interfaces that correspond to the plurality of destination servers, wherein the outgoing interfaces correspond to the destination IP addresses of the plurality of destination servers, and wherein the router is further configured to send the multicast client request over the plurality of outgoing interfaces.

According to the third exemplary embodiment the router is further configured to receive a join request from a new destination server, such that an outgoing interface corresponding to the new destination server is added to the multicast record.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS

The various features of the preferred embodiments will now be described with reference to the figures, in which like parts are identified with the same reference characters. The following description of the presently contemplated best mode of practicing the invention is not to be taken in a limiting sense, but is provided merely for the purpose of describing the general principles of the invention.

As known to those of ordinary skill in the art, client and destination servers in networks often communicate in what is known as a unicast transmission mode. In a unicast transmission mode, a client sends messages to destination servers on a one-to-one basis; that is, client server A sends a request to destination server B, and destination server B responds (to client A), but the communication link, although it might be complex, is from point-to-point. The "complexity" might arise because there may be different paths the client request can propagate along, but it still only proceeds from point A to point B (and point B to point A).

Figure 1:
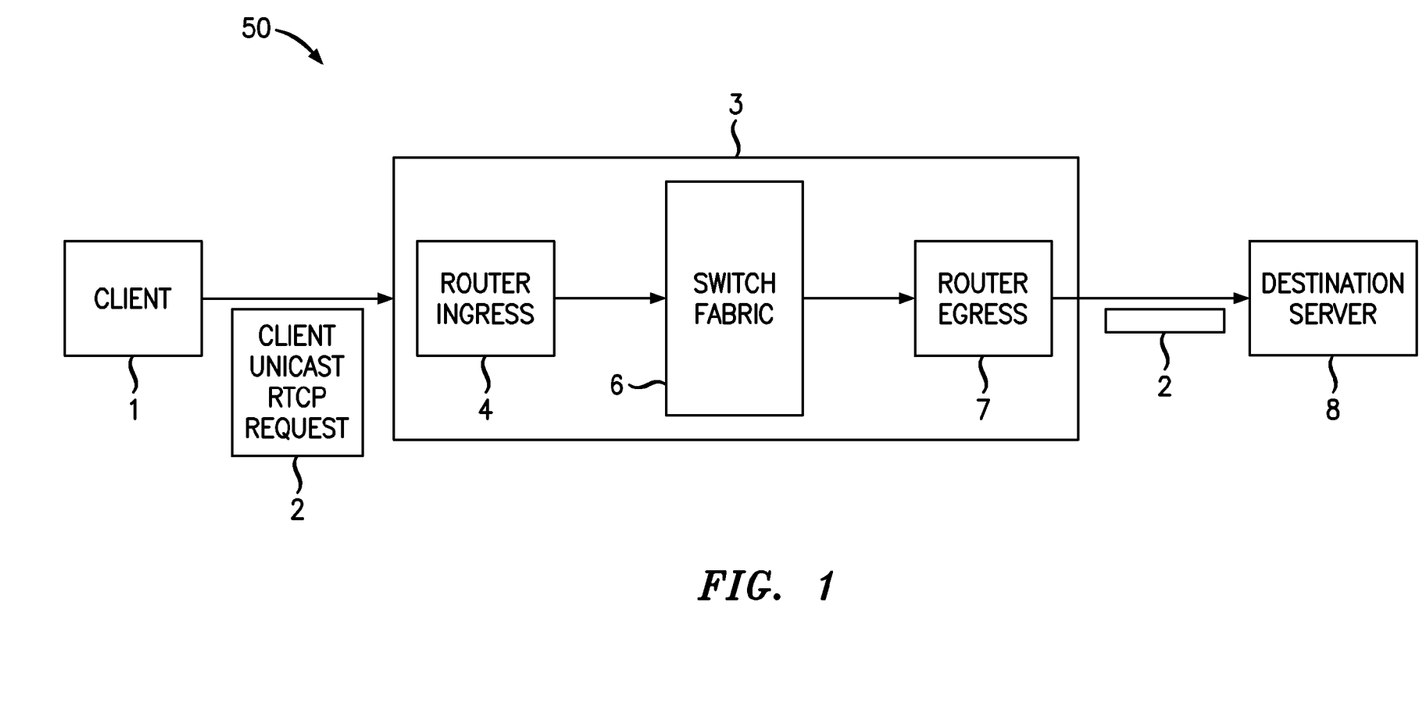
FIG. 1 illustrates a communications network for transmitting unicast client requests to a single destination server.

Referring now to FIG. 1, a block diagram is shown that illustrates unicast communications network (unicast network) 50 for transmitting client unicast requests (client requests) 2 to a single destination server. Unicast network 50 includes client 1, router 3, and destination server 8. Router 3 further includes router ingress 4, switch fabric 6, and router egress 7. As those of ordinary skill in the art can appreciate, communication system 50 can further include more than one client servers 1, switch fabrics 6, router ingresses 4, and destination servers 8.

When communicating in unicast network 50, client Unicast RTCP requests (client requests) 2 are sent as unicast packets to destination server 8 through router ingress 4, and switch fabric 6. FIG. 1, as those of ordinary skill in the art can appreciate, is a simplified conceptual view of unicast network 50, as there usually are many other communication devices involved. Client requests 2 are forwarded hop-by-hop to destination server 8. Destination server 8 then processes client requests 2, and responds back to client 1. As discussed above, the problem with this simple client-server architecture is that all the client requests end up at a single destination server 8.

As those of ordinary skill can appreciate, some applications require client requests to be sent to multiple destination servers. One reason for forwarding client requests to multiple servers is load balancing. Load balancing is a technique to spread work between two or more computers, network links, CPUs, hard drives, or other resources, in order to maximize resource utilization, increase throughput, and decrease (hopefully minimizing) response time. The use of multiple components with load balancing, instead of a single component, can also increase reliability (as each component is used less on average with multiple components than otherwise).

Another example of a good reason to forward client requests to multiple servers is redundancy. If the client request is sent to a redundant destination server 8, client 1 has essentially doubled the probability of a response. There are, as known to those of ordinary skill in the art, other reasons for forwarding client requests 2 to multiple destination servers 8. But, as those of ordinary skill in the art can further appreciate, typical unicast forwarding cannot send requests to multiple destination servers 8. Thus, according to an exemplary embodiment, a system and method and presented herein that facilitates unicast client requests to be sent to multiple destination servers 8.

Figure 2:
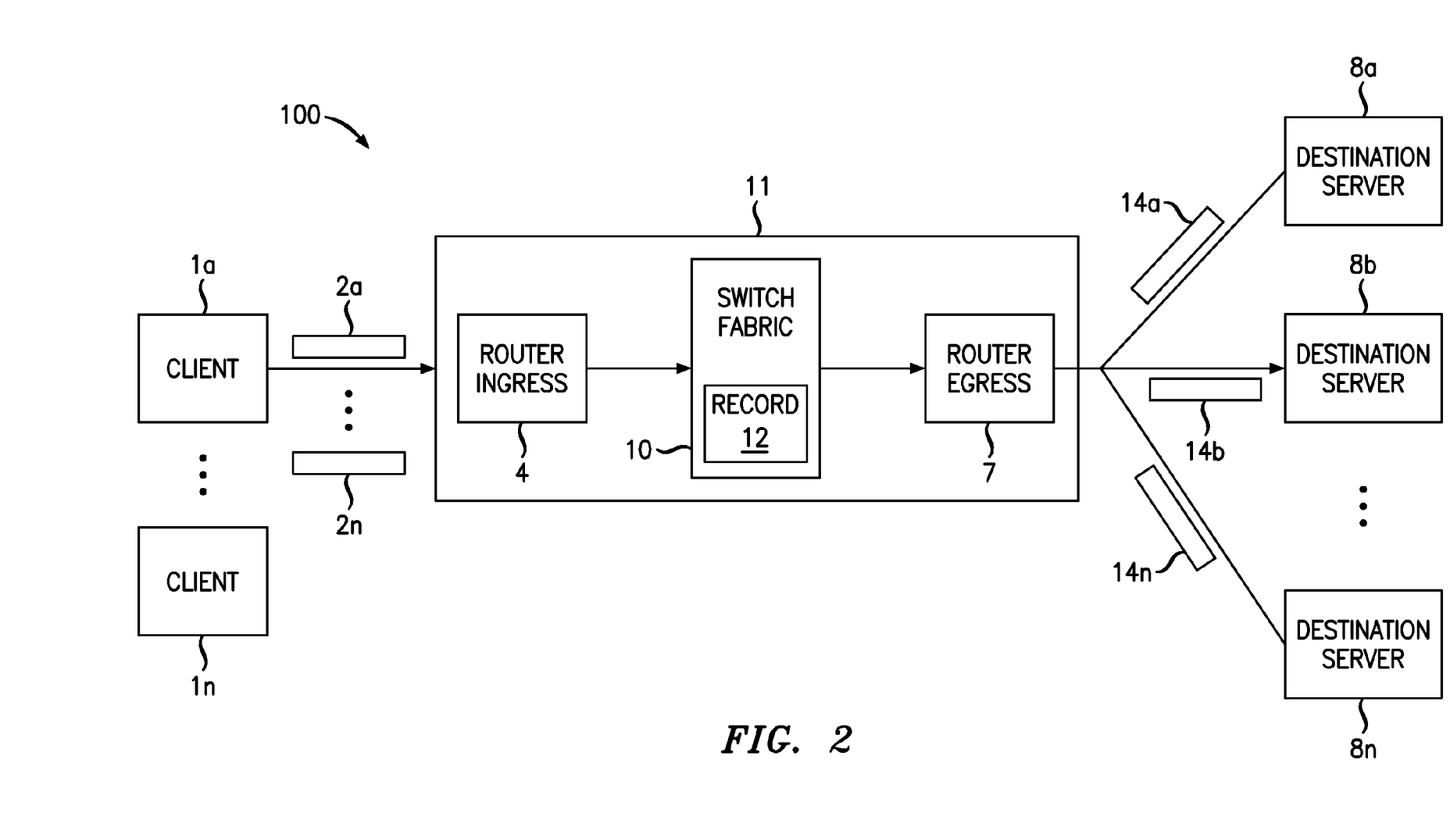
FIG. 2 illustrates a communications network for transmitting unicast client requests as a multicast client request to two or more destination servers according to an exemplary embodiment.

FIG. 2 illustrates a communications network for transmitting unicast client requests 2 as a multicast client request to two or more destination servers 8 according to an exemplary embodiment. As shown in FIG. 2, network 100 includes clients 1*a-n*, multi-cast router 11, and destination servers 8*a-n*. Multicast router 11 includes router ingress 4, switch fabric 10, record 12 (part of switch fabric 10), and router egress 7. Any one or more of clients 1, router ingress 4, switch fabric 10, router egress 7, or destination servers 8 can also be preferably implemented by the use of one or more hardware components such as, for example, computers manufactured by any one of several different manufacturers, or can be implemented as specialized communications equipment. Any one or more of client 1, router ingress 4, switch fabric 10, router egress 7, or destination server 8 can include a microprocessor. The microprocessor can be any type of processor, such as, for example, any type of microprocessor or microcontroller, a digital signal processing (DSP) processor, an application-specific integrated circuit (ASIC), a programmable read-only memory (PROM), or any combination thereof. Further, any one or more of client 1, router ingress 4, switch fabric 10, router egress 7, or destination server 8 can use its microprocessor to read a computer-readable medium containing software that includes instructions for carrying out one or more of the functions of switch fabric 10, as further described below.

Each of client 1, router ingress 4, router egress 7, switch fabric 10, or destination server 8 can also include any type of computer memory or any other type of electronic storage medium that is located either internally or externally to each of client 1, router ingress 4, switch fabric 10, router egress 7, or destination server 8, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), or the like. According to exemplary embodiments, the respective memory can contain, for example, the operating program for any one or more of client 1, router ingress 4, switch fabric 10, router egress 7, or destination server 8. As will be appreciated based on the following description, the memory can, for example, be programmed using conventional techniques known to those having ordinary skill in the art of computer programming. The actual source code or object code for carrying out the steps of, for example, a computer program can be stored in the memory. Each of client 1, router ingress 4, switch fabric 10, router egress 7, or destination server 8 can also include one or more databases. The database can be any type of computer database for storing, maintaining, and allowing access to electronic information stored therein.

According to an exemplary embodiment, switch fabric 10 is configured to contain record 12 that facilitates or creates multicast transmissions from single unicast transmissions. Switch fabric 10 can store record 12 in a computer readable medium, computer memory, electrical storage medium, optical storage medium, magnetic storage medium, biological storage medium, or within a computer, microprocessor, or the like, as discussed above. Record 12, shown in greater detail in FIG. 3, maps the destination unicast IP address/destination UDP or TCP port of the client unicast request 2 to a multicast record, which also contains various IP addresses and ports. Switch fabric 10 then creates on or more new requests, one for each matching multicast record, and re-transmits the original request from client server 1 through router egress 7 to the appropriate multicast destination servers 8*a-8n*.

According to an exemplary embodiment, switch fabric 10 receives the client's unicast request 2 through router ingress 4, and then converts it into client multicast request 14. Switch fabric 10 contains record 12, preferably stored within memory of switch fabric 10, which can map (or match) the destination unicast IP address and/or destination UDP or TCP port to a multicast record. Record 12 contains a list of destination servers 8*a-8n* that are interested and capable of receiving client requests 2 as client multicast requests 14. According to a further exemplary embodiment, destination servers 8 can utilize an internet group multicast protocol (IGMP) join to join one or more other destination serves 8 to form a group capable of receiving client multicast requests 14.

The creation of record 12 can be accomplished by the owner/operator of network 100, or can be created by another party, and stored in switch fabric 10. The mapping of client requests 2 to destination servers 8*a-8n* can be accomplished according to any one of several different methods. According to an exemplary embodiment, for example, any client request 2 from a first group of clients 1*a*, 1*b*, and 1*c*, for example, can be sent to a first group of destination servers 8. Following this same rule, client requests 2 from a second group of clients 1*d*, 1*e*, and 1*f*, can be sent to a second group of multicast destination servers 8. The first and second group of multicast destination servers 8 can overlap, or be completely distinct.

Thus, according to this exemplary embodiment, any client request 2 from clients 1*a*, 1*b*, or 1*c* can be multicast to destination servers 8*a*, 8*b*, and 8*c* as client multicast requests 14*a*, 14*b*, and 14*c*. Further, any client request 2 from clients 1*d*, 1*e*, or 1*f* can be multicast to destination servers 8*d*, 8*e*, and 8*f* as client multicast requests 14*d*, 14*e*, and 14*f*. According to another example that corresponds to this exemplary embodiment, client requests 2 from clients 1*g* and 1*h* can be multicast to destination server group that contains destination servers 8*b*, 8*d*, and 8*j*.

According to a further exemplary embodiment, router 11 of system 100 can be further configured to determine, by accessing multicast record 12, a plurality of outgoing interfaces that correspond to the plurality of destination servers 8*a-n*. The outgoing interfaces correspond to the destination IP addresses of the plurality of destination servers 8*a-n*. following the aforementioned determination, router 11 is still further configured, according to an exemplary embodiment, to send the multicast client request over the plurality of outgoing interfaces.

According to another exemplary embodiment, router 11 is further configured to receive a join request from a new destination server 8, such that an outgoing interface corresponding to new destination server 8 is added to multicast record 12.

Figure 4:
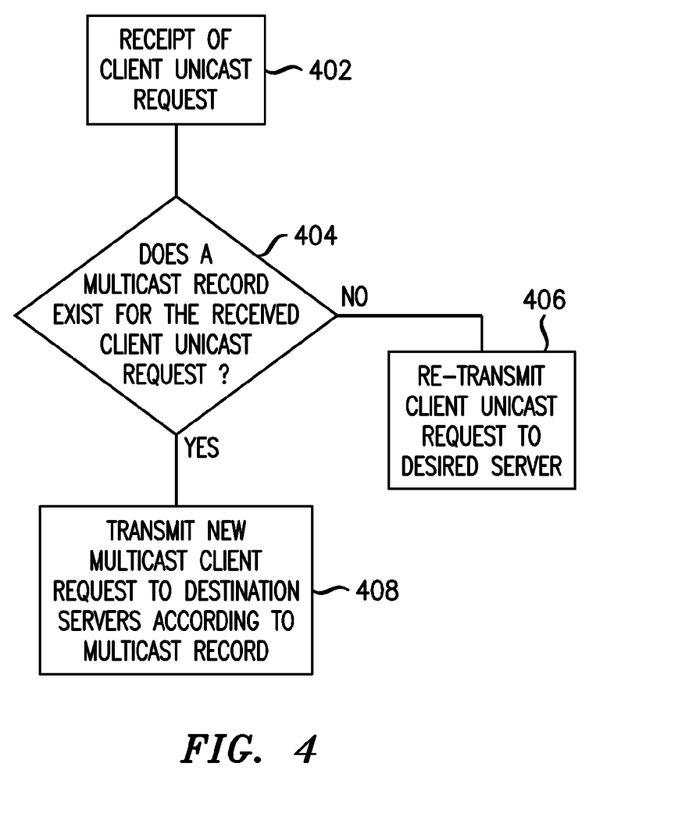
FIG. 4 illustrates a method of mapping a unicast client request to a multicast client request according to an exemplary embodiment.

FIG. 4 illustrates a method of mapping unicast client request 2 to destination server group 8*a-8n* according to an exemplary embodiment.

According to an exemplary embodiment, method 400 begins with the receipt of unicast client request 2, in step 402, by switch fabric 10. Following receipt of client request 2, in decision step 404, switch fabric 10 consults record 12 to determine if an appropriate multicast record exists. If an appropriate multicast record does not exist ("No" path from decision step 404), method 400 proceeds to step 406, and proceeds to re-transmit client request 2 in a unicast fashion to the appropriate destination server 8.

Figure 3:
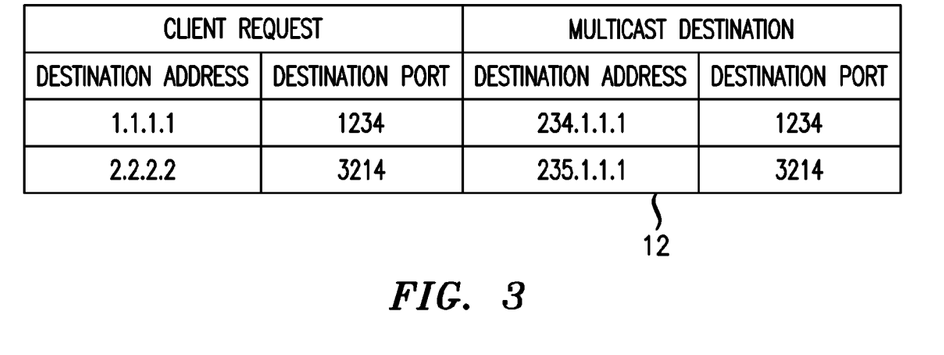
FIG. 3 illustrates a multicast record that is included in a switch fabric that is part of the communications network as shown in FIG. 2.

If, however, an appropriate multicast record exists, then method 400 causes switch fabric 10 to transmit a new client multicast request 14 to the designated destination servers 8, as listed in record 12 (step 408). By way of example, and referring to FIG. 3, presume a first client request 2a includes destination address 3.3.3.3. Since there is no multicast destination record for that client request 2a in record 12 as shown in FIG. 3, switch fabric 10 simply re-transmits first client request 2a to the destination server 8 with destination address 3.3.3.3. In a second example, second client request 2b contains destination address 1.1.1.1, destination port 1234. Switch fabric 10 consults record 12 and determines that there is a multicast record for that particular client request 2b, and forwards client request 2b as new multicast client request 14 to destination servers 8 that correspond to the destination address of 234.1.1.1 as shown in FIG. 3.

According to a further exemplary embodiment, the step of transmitting 408 in method 400 comprises determining, by accessing multicast record 12, a plurality of outgoing interfaces that correspond to the plurality of destination servers 8a-n, wherein the outgoing interfaces correspond to the destination IP addresses of the plurality of destination servers. Following the step of determining, method 400 sends multicast client request 14 over the plurality of outgoing interfaces.

According to another exemplary embodiment, method 400 further comprises receiving a join request from a new destination server 8, such that an outgoing interface corresponding to the new destination server 8 is added to multicast record 12.

Thus, according to an exemplary embodiment, when client 1 transmits client request 2, it will arrive at switch fabric 10. It then performs a lookup based on the destination address and destination port of client request 2. If this lookup is successful, the entity will have a multicast record. It will then use the multicast record to replicate the client's unicast request. This replication will result in all the servers in the multicast record receiving client request 2 as client multicast record 14.

Figure 5:
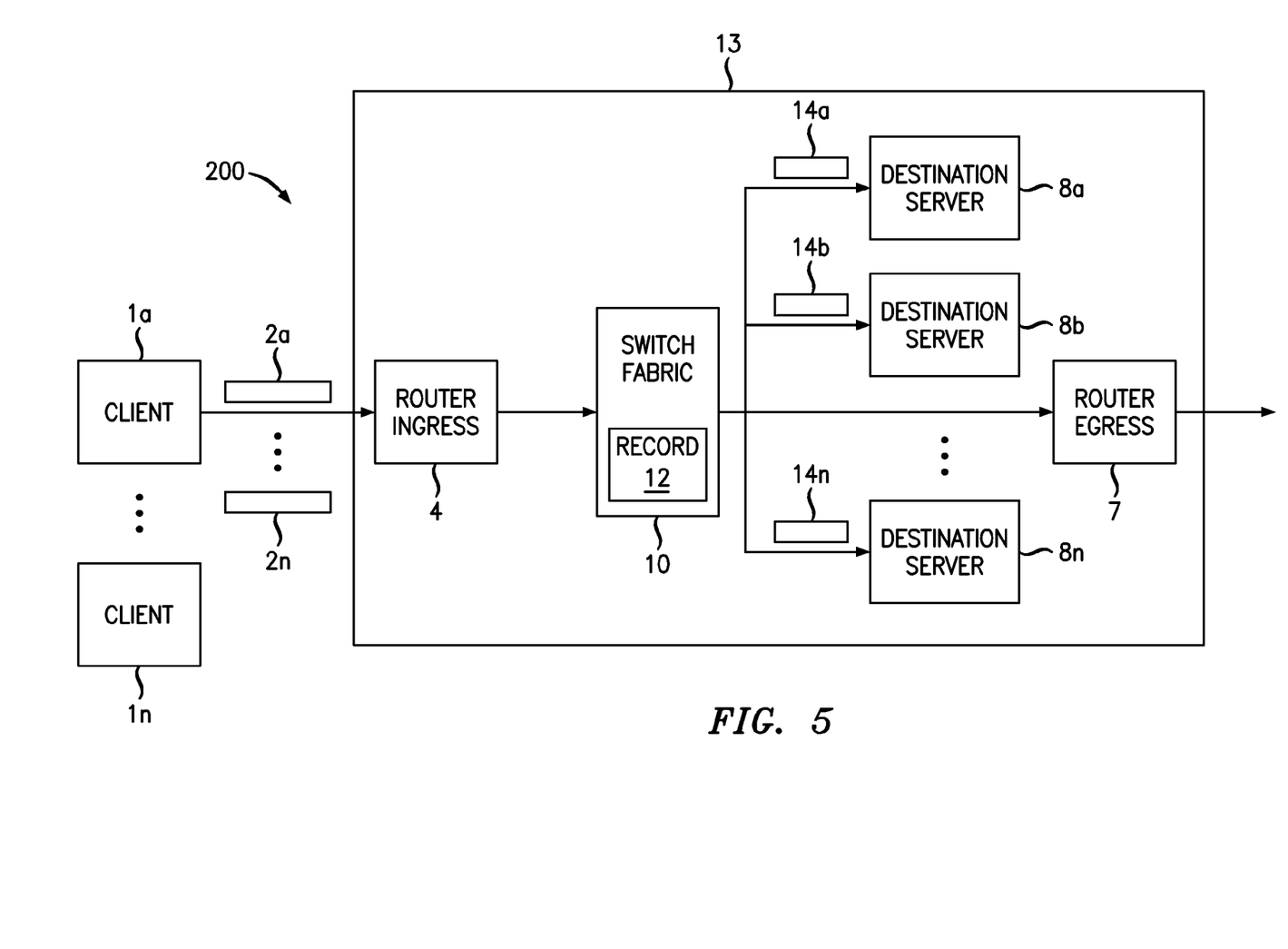
FIG. 5 illustrates a communications network for transmitting unicast client requests as a multicast client request to two or more destination servers according to a further exemplary embodiment.

As briefly discussed above, according to an exemplary embodiment, multicast router 11 and system 100 (as well as multicast router 13 and system 200, discussed in detail below) can be used to provide load balancing of client requests and to provide fully lossless redundancy. Load balancing can be accomplished by providing destination servers 8a-n with the capability of communicating with each other such that when client multicast request 14 is received by each destination server 8a-n, only one of the destination servers 8a-n will respond to client multicast request 14. In this manner, by splitting the data transmission chores, the probability of the client request being fulfilled increase, and the probability of lost client requests diminishes. Overall effectiveness of the network will increase.

Referring now to FIG. 5, and according to a further exemplary embodiment, multicast router 13 can have multiple servers 8a-n embedded within it. As shown in FIG. 5, multicast router 13 includes switch fabric 10 that can be pre-programmed with record 12 that maps the destination address and destination port in client request 2 to multicast record 12. Multicast record 12 itself is programmed with a list of outgoing interfaces that lead to the embedded servers 8a-n. According to an exemplary embodiment, destination servers 8a-n can take the form of line cards within multicast router 13.

FIG. 5 illustrates a communications network 200 for transmitting client requests 2 as a multicast client request 14 to two or more destination servers 8a-n according to an exemplary embodiment. As shown in FIG. 5, network 200 includes clients 1a-n, and multicast router 13. Multicast router 13 includes destination servers 8a-n, router ingress 4, switch fabric 10, record 12 (part of switch fabric 10), and router egress 7. As discussed above in regard to FIG. 2, any one or more of clients 1, router ingress 4, switch fabric 10, router egress 7, or destination servers 8 can also be preferably implemented by the use of one or more computers, such as, for example, computers manufactured by any one of several different manufacturers, or can be implemented as specialized communications equipment. As discussed above in regard to FIG. 2, any one or more of client 1, router ingress 4, switch fabric 10, router egress 7, or destination servers 8 can include a microprocessor. The microprocessor can be any type of processor, such as, for example, any type of microprocessor or microcontroller, a digital signal processing (DSP) processor, an application-specific integrated circuit (ASIC), a programmable read-only memory (PROM), or any combination thereof. Further, as discussed above in regard to FIG. 2, any one or more of client 1, router ingress 4, switch fabric 10, router egress 7, or destination servers 8 can use its microprocessor to read a computer-readable medium containing software that includes instructions for carrying out one or more of the functions of switch fabric 10, as further described below.

Regarding the components of FIG. 5, each of client 1, router ingress 4, router egress 7, switch fabric 10, or destination server 8 can also include any type of computer memory or any other type of electronic storage medium that is located either internally or externally to each of client 1, router ingress 4, switch fabric 10, router egress 7, or destination server 8, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), or the like. According to exemplary embodiments, the respective memory can contain, for example, the operating program for any one or more of client 1, router ingress 4, switch fabric 10, router egress 7, or destination server 8 as shown in FIG. 5. As will be appreciated based on the following description, the memory can, for example, be programmed using conventional techniques known to those having ordinary skill in the art of computer programming. The actual source code or object code for carrying out the steps of, for example, a computer program can be stored in the memory. Each of client 1, router ingress 4, switch fabric 10, router egress 7, or destination server 8 of FIG. 5 can also include one or more databases. The database can be any type of computer database for storing, maintaining, and allowing access to electronic information stored therein.

According to an exemplary embodiment, multicast switch fabric 10 is configured to contain record 12 that facilitates multicast transmissions from single unicast transmissions. Multicast switch fabric 10 can store record 12 in a computer readable medium, computer memory, electrical storage medium, optical storage medium, magnetic storage medium, biological storage medium, or within a computer, microprocessor, or the like, as discussed above. Record 12, shown in greater detail in FIG. 3, maps the destination unicast IP address/destination UDP or TCP port of the client unicast request 2 to a multicast record, which also contains various IP addresses and ports. Multicast switch fabric 10 then creates a new request (client multicast request 14), and transmits the original client request 2 from client 1 as client multicast request 14 through router egress 7 to the appropriate multicast destination servers 8*a-n*.

According to an exemplary embodiment, multicast switch fabric 10 receives client request 2 through router ingress 4, and then converts it into client multicast request 14. Multicast switch fabric 10 contains record 12, preferably stored within memory of switch fabric 10, which can map (or match) the destination unicast IP address and/or destination UDP or TCP port to a multicast record. Record 12 contains a list of destination servers 8*a*-8*n* that are interested and capable of receiving client requests 2 as client multicast requests 14.

The creation of record 12 can be accomplished by the owner/operator of network 200, or can be created by another party, and stored in switch fabric 10. The mapping of client requests 2 to destination servers 8*a*-8*n* can be accomplished according to any one of several different methods, as discussed above in regard to FIG. 2.

According to a preferred embodiment, one exemplary use of system 100 or system 200, with multicast router 11, or multicast router 13, and switch fabric 10 with record 12 is an IPTV network. As known to those of skill in the art, internet protocol television (IPTV) is a system where digital television service is delivered using internet protocol (IP) over a network infrastructure. Usually, delivery of IPTV content it performed by a broadband connection, as TV generally requires a lot of data, which would very difficult to acquire on anything but a broadband connection.

Regardless of how the content is delivered, it is often found to be the case that multiple viewers either want to watch the same channel, which can lead to channel congestion, or a single user can "surf" or flip through the channels rather quickly. In the former case, one destination server 8 may become overloaded if multiple users request the same IPTV content, thereby leading to a possible "crashing" of the system due to overuse. In the latter case, client 1 sends a first client request 2*a* for a first channel; then, very soon after first client request 2*a* has been sent, second client request 2*b* is sent requesting content from a second channel; and then third, and fourth client requests 2*c*, 2*d*, are sent, and so on. The multiple client requests 2*a-n* arrive at first destination server 8*a* one right after the other, and destination server 8*a* (which stores and delivers the IPTV content upon demand), may have difficulty transmitting the desired channel content information as fast as the user has requested it (with the multiple client requests 2*a-d*).

According to an exemplary embodiment, use of multicast router 13 with embedded destination servers 8*a-n* can substantially eliminate or reduce channel changing content delivery delays, and overloading of destination servers by multiple users. According to an exemplary embodiment, a plurality of destination servers 8*a-n* are loaded with identical IPTV content in multicast router 13, in system 200. If a client changes channels rapidly, destination servers 8*a-n* can hand off the new channel request among themselves, allowing the most available and ready destination server 8 to respond to the newest channel request. By spreading the load between different destination servers 8*a-n*, faster response times to channel changing (or surfing) can be accommodated. Furthermore, if multicast router 13 (or 11) is used, and multiple users request the same channel, even with little or no channel changing or surfing, then destination servers 8*a-n* can spread the load among themselves, as the unicast requests are replicated according to the exemplary embodiments discussed herein, and multiple destination servers receive the requests, and different ones can be chosen (or "volunteer") to deliver the desired content. As those of ordinary skill in the art can appreciate, the exemplary embodiments discussed herein of the use of multicast routers 11 and 13 with switch fabrics 10 and records 12 are not limited to ITPV servers or that type of content. Virtually any content that can be stored on the destination servers (i.e., data, video, audio, or any combinations thereof) can make use of the discussed embodiments discussed herein to increase response times, and provide additional robustness of the system for delivering content.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A method of converting a unicast client request into a multicast client request, the method comprising:
   receiving the unicast client request;
   mapping a unicast client request destination IP address and a unicast client request destination port to a multicast record, wherein the multicast record comprises a multicast destination internet protocol (IP) address that corresponds to a lookup of both the unicast client request destination IP address and the unicast client request destination port; and
   transmitting a multicast client request that mirrors the received unicast client request to a plurality of destination servers using the multicast destination IP address that corresponds to the unicast client request destination IP address and the unicast client request destination port;
   determining, by accessing the multicast record, a plurality of outgoing interfaces that correspond to the plurality of destination servers, wherein the outgoing interfaces correspond to multicast destination IP addresses of the plurality of destination servers; and
   sending the multicast client request over the plurality of outgoing interfaces
   receiving a join request from a new destination server; and
   adding an outgoing interface corresponding to the new destination server to the multicast record.

2. The method according to claim 1, further comprising:
   choosing the corresponding multicast destination IP address based on both the unicast client request destination IP address and the unicast client request destination port.

3. A method of converting a unicast client request into a multicast client request, the method comprising:
   receiving the unicast client request;
   mapping a unicast client request destination IP address and a unicast client request destination port to a multicast record, wherein the multicast record comprises a multicast destination internet protocol (IP) address that corresponds to a lookup of both the unicast client request destination IP address and the unicast client request destination port;
   transmitting a multicast client request that mirrors the received unicast client request to a plurality of destination servers using the multicast destination IP address that corresponds to the unicast client request destination IP address and the unicast client request destination port;
responding to the multicast client request by a predetermined number of the plurality of destination servers based on a load balancing arrangement; and
determining the load balancing arrangement prior to receipt of the multicast client request.

4. A method of converting a unicast client request into a multicast client request, the method comprising:
receiving the unicast client request;
mapping a unicast client request destination IP address and a unicast client request destination port to a multicast record, wherein the multicast record comprises a multicast destination internet protocol (IP) address that corresponds to a lookup of both the unicast client request destination IP address and the unicast client request destination port; and
transmitting a multicast client request that mirrors the received unicast client request to a plurality of destination servers using the multicast destination IP address that corresponds to the unicast client request destination IP address and the unicast client request destination port;
responding to the multicast client request by a predetermined number of the plurality of destination servers based on a load balancing arrangement; and
determining the load balancing arrangement following receipt of the client requests.

5. A system for converting a unicast client request into a multicast client request, the system comprising:
a plurality of destination servers; and
a router configured to receive the unicast client request, map both a unicast client request destination IP address and a unicast client request destination port to a multicast record comprising a multicast destination IP address, and transmit the multicast client request that mirrors the received unicast client request to the plurality of destination servers using the multicast destination IP address that corresponds to a lookup of both the unicast client request destination IP address and the unicast client request destination port,
wherein the router is further configured to receive a join request from a new destination server, and to add an outgoing interface corresponding to the new destination server to the multicast record.

6. The system according to claim 5, wherein the corresponding multicast destination IP address is chosen based on both the unicast client request destination IP address and the unicast client request destination port.

7. The system according to claim 5, wherein the router is further configured to determine, by accessing the multicast record, a plurality of outgoing interfaces that correspond to multicast destination IP addresses of the plurality of destination servers, and send the multicast client request over the plurality of outgoing interfaces.

8. The system according to claim 5, wherein the system further comprises:
an internet protocol television system configured to distribute television, video, and audio content.

9. A system for converting a unicast client request into a multicast client request, the system comprising:
a plurality of destination servers; and
a router configured to receive the unicast client request, map both a unicast client request destination IP address and a unicast client request destination port to a multicast record comprising a multicast destination IP address, and transmit the multicast client request that mirrors the received unicast client request to the plurality of destination servers using the multicast destination IP address that corresponds to a lookup of both the unicast client request destination IP address and the unicast client request destination port; wherein the plurality of destination servers are configured to respond to the multicast client request by a predetermined number of the plurality of destination servers based on a load balancing arrangement determined prior to receipt of the multicast client request.

10. A system for converting a unicast client request into a multicast client request, the system comprising:
a plurality of destination servers; and
a router configured to receive the unicast client request, map both a unicast client request destination IP address and a unicast client request destination port to a multicast record comprising a multicast destination IP address, and transmit the multicast client request that mirrors the received unicast client request to the plurality of destination servers using the multicast destination IP address that corresponds to a lookup of both the unicast client request destination IP address and the unicast client request destination port; wherein the plurality of destination servers are configured to respond to the multicast client request by a predetermined number of the plurality of destination servers based on a load balancing arrangement determined following receipt of the multicast client request.

11. A system for converting a unicast client request into a plurality of multicast client requests, the system comprising:
a router configured to receive the unicast client request, wherein the router includes a plurality of destination servers, map a unicast client request destination IP address and a unicast client request destination port to a multicast record, wherein the multicast record comprises a multicast destination IP address that corresponds to a lookup of both the unicast client request destination IP address and the unicast client request destination port, and the transmit the multicast client request that mirrors the received unicast client request to a plurality of destination servers using the multicast destination IP address that corresponds to the unicast client request destination IP address and the unicast client request destination port,
wherein the router is further configured to receive a join request from a new destination server, and to add an outgoing interface corresponding to the new destination server the multicast record.

12. The system according to claim 11, wherein the system further comprises:
an internet protocol television system configured to broadcast television video and audio content.

13. The system according to claim 11, wherein the router is further configured to determine, by accessing the multicast record, a plurality of outgoing interfaces that correspond to destination IP addresses of the plurality of destination servers, and send the multicast client request over the plurality of outgoing interfaces.

14. The system of claim 11, wherein the router further comprises a switch fabric pre-programmed to map both the unicast client request destination IP address and the unicast client request destination port to the multicast record.

15. A system for converting a unicast client request into a plurality of multicast client requests, the system comprising:
a router configured to receive the unicast client request, wherein the router includes a plurality of destination servers, map a unicast client request destination IP address and a unicast client request destination port to a multicast record, wherein the multicast record comprises a multicast destination IP address that corresponds to a lookup of both the unicast client request destination IP address and the unicast client request destination port, and transmit the multicast client request that mirrors the received unicast client request to the plurality of destination servers using the multicast destination IP address that corresponds to the unicast client request destination IP address and the unicast client request destination port, wherein the plurality of destination servers are configured to respond to the multicast client request by a predetermined number of the plurality of destination servers based on a load balancing arrangement determined prior to receipt of the multicast client request.

16. A system for converting a unicast client request into a plurality of multicast client requests, the system comprising:
a router configured to receive the unicast client request, wherein the router includes a plurality of destination servers, map a unicast client request destination IP address and a unicast client request destination port to a multicast record, wherein the multicast record comprises a multicast destination IP address that corresponds to a lookup of both the unicast client request destination IP address and the unicast client request destination port, and transmit the multicast client request that mirrors the received unicast client request to the plurality of destination servers using the multicast destination IP address that corresponds to the unicast client request destination IP address and the unicast client request destination port, wherein the plurality of destination servers are configured to respond to the multicast client request by a predetermined number of the plurality of destination servers based on a load balancing arrangement determined following receipt of the multicast client request.

* * * * *